(12) United States Patent
Mason et al.

(10) Patent No.: US 10,946,738 B2
(45) Date of Patent: Mar. 16, 2021

(54) VEHICLE FUEL TANK ASSEMBLY

(71) Applicants: Robert Bosch LLC, Broadview, IL (US); Robert Bosch GmbH, Stuttgart (DE)

(72) Inventors: Paul Mason, Dearborn, MI (US); David P. Toutant, Harper Woods, MI (US)

(73) Assignees: Robert Bosch LLC, Broadview, IL (US); Robert Bosch GmbH, Stuttgart (DE)

( * ) Notice: Subject to any disclaimer, the term of this patent is extended or adjusted under 35 U.S.C. 154(b) by 77 days.

(21) Appl. No.: 16/146,066

(22) Filed: Sep. 28, 2018

(65) Prior Publication Data

US 2020/0101837 A1    Apr. 2, 2020

(51) Int. Cl.
*B60K 15/04* (2006.01)
*B60K 15/03* (2006.01)

(52) U.S. Cl.
CPC .... *B60K 15/04* (2013.01); *B60K 2015/03401* (2013.01); *B60K 2015/0458* (2013.01)

(58) Field of Classification Search
CPC .......... B60K 15/04; B60K 2015/03401; B60K 2015/0458
USPC ......................................................... 141/98
See application file for complete search history.

(56) References Cited

U.S. PATENT DOCUMENTS

| 7,259,330 | B2 * | 8/2007 | Akuzawa | H01R 4/64 174/74 R |
| 9,834,090 | B2 | 12/2017 | McKinster et al. | |
| 2003/0006253 | A1 * | 1/2003 | Yelton | B65D 43/169 222/494 |
| 2003/0006523 | A1 * | 1/2003 | Suzuki | B29C 70/74 264/136 |
| 2010/0020461 | A1 * | 1/2010 | Heeter | B64D 37/32 361/218 |

* cited by examiner

*Primary Examiner* — Jessica Cahill
*Assistant Examiner* — Christopher M Afful
(74) *Attorney, Agent, or Firm* — Kelly McGlashen; Maginot, Moore & Beck LLP

(57) ABSTRACT

A vehicle fuel tank assembly includes a fuel tank and an electrically conductive top plate that closes and seals a fuel-fill opening in the fuel tank. The top plate includes electrical dissipation structures and features that allow for electrical charge dissipation of the fuel tank to an external structure such as the vehicle chassis. The dissipation structures include an electrically insulative carrier that is partially embedded in the top plate using an overmolding process, and an electrical conductor that is supported by the carrier. The electrical conductor provides an electrical connection between the top plate and the chassis that is independent of the fuel tank and the fuel tank mounting structure.

20 Claims, 5 Drawing Sheets

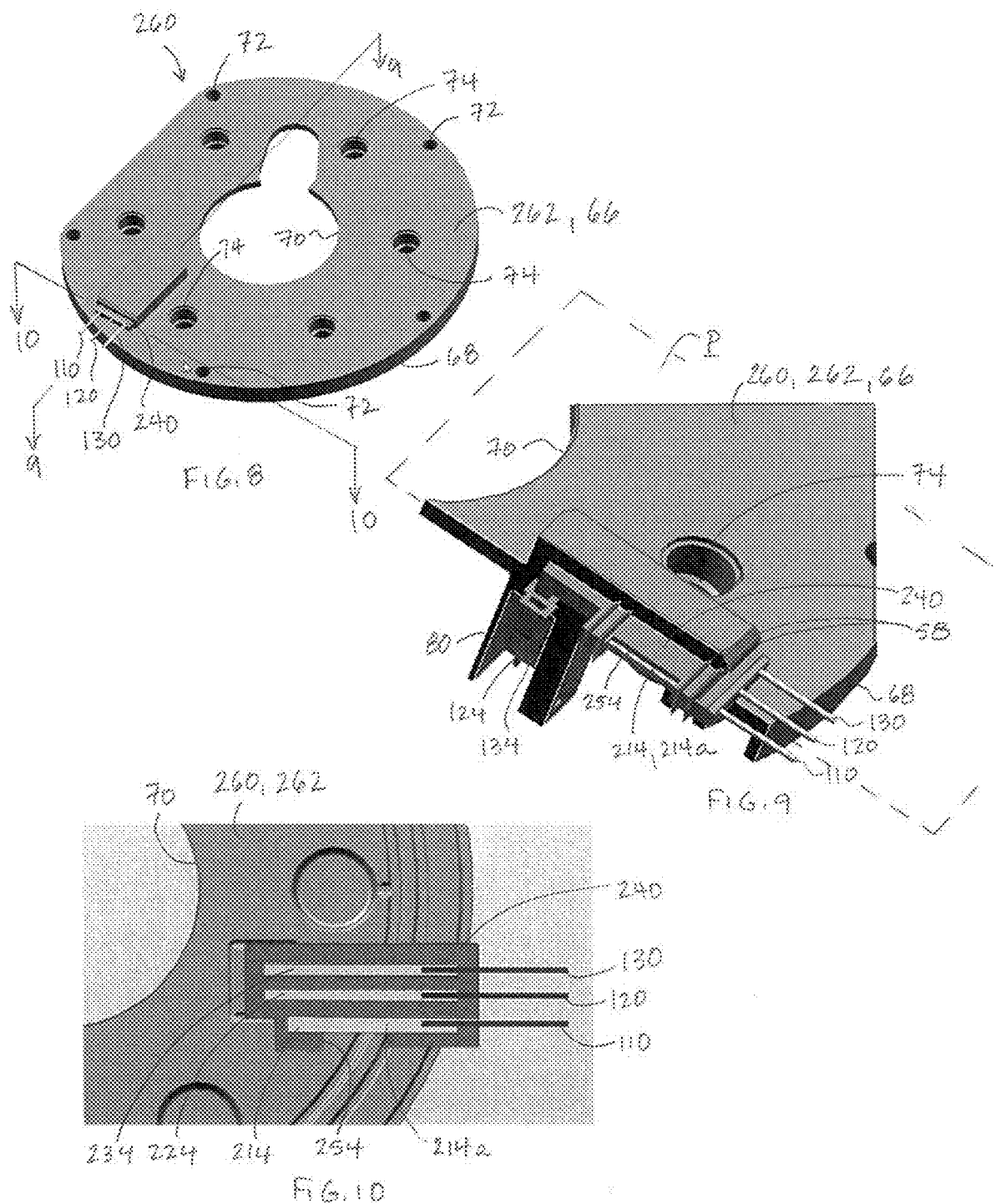

VEHICLE FUEL TANK ASSEMBLY

BACKGROUND

Fuels produced from petroleum such as gasoline can build up a charge of static electricity when they are poured or flow through hoses, or are dashed about within a fuel tank. When enough of a charge is built up, an uncontrolled electrical discharge of the static electricity, for example in the form of a spark, may result. If the vapor concentration of the liquid in air is in the "flammable range" and the spark has enough energy, a fire, or explosion can result.

To avoid an uncontrolled electrical discharge, some vehicle fuel tanks are grounded to other parts of the vehicle such as the chassis via mounting bolts used to secure the fuel tank to the vehicle chassis. However, other vehicle fuel tanks may be mounted to the chassis using electrically non-conductive mounting assemblies, whereby simple electrical grounding of the fuel tank via the fuel tank mounting structure is difficult or impossible. Modifications of such electrically non-conductive mounting assemblies, for example by placing terminals under the mounting bolts, are not preferred since such modifications may not be reconnected properly following subsequent service operations. In addition, some vehicle fuel tanks are grounded to other parts of the vehicle such as the chassis via a direct mechanical contact between the metal fuel tank and the metal chassis. However, other vehicle fuel tanks may have non-electrically conductive coatings, whereby simple electrical grounding of the fuel tank via direct mechanical contact between an outer surface of the fuel tank and the vehicle chassis is difficult or impossible.

To avoid a build up of static electrical charge within a vehicle fuel tank that is electrically isolated from the vehicle, it is desirable to provide a fuel tank assembly that includes structures that provide a ground path for the safe and reliable discharge of static electricity that accumulates on the fuel tank. Moreover, it is desirable to provide the ground path in such a way that the vehicle will not function properly without the ground path, and to provide a ground path that is robust against service procedures and accidental misuse.

SUMMARY

In some aspects, a fuel tank assembly includes a fuel tank having a fuel fill opening and top plate that is configured to seal the fuel fill opening. The top plate includes a body having a first material that is electrically conductive, and a carrier having a second material that is electrically insulative. The carrier is partially embedded in the body. In addition, the top plate includes a first electrical conductor that is supported by the carrier in such a way that a portion of the first electrical conductor is electrically connected to the body.

In some embodiments, the first electrical conductor includes an electrically conductive first terminal and an electrically conductive first wire. The first terminal includes the portion of the first electrical conductor that is electrically connected to the body. In addition, the first wire has a wire first end that is electrically connected to the first terminal and a wire second end that is disposed outside of the top plate.

In some embodiments, the wire second end is electrically connected to electrical ground.

In some embodiments, the carrier includes a cut out, and the cut out is disposed in a portion of the carrier that is embedded in the body. In addition, the first terminal is supported by the carrier in such a way that a portion of the first terminal extends into the cut out, and the portion of the first terminal forms an electrical connection with the body.

In some embodiments, the first terminal has a first portion that is embedded in the first material and a second portion that is embedded in the second material.

In some embodiments, the carrier includes a protruding portion that protrudes from the body in a direction parallel to a plane that includes an outward-facing surface of the body, and the first wire is supported in the protruding portion so as to extend in a direction that is parallel to the plane.

In some embodiments, the top plate includes a second electrical conductor that is supported by the carrier in such a way that the second electrical conductor is electrically isolated from the body.

In some embodiments, the body is a plate having an outward-facing surface, an inward-facing surface, and a peripheral edge that extends between the outward-facing surface and the inward-facing surface. The carrier protrudes from the body in a direction parallel to a plane that includes the outward-facing surface.

In some embodiments, the carrier protrudes from the peripheral edge of the body.

In some embodiments, the fuel tank assembly includes a mounting assembly that electrically isolates the fuel tank assembly from a vehicle that supports the fuel tank assembly.

In some embodiments, the body is a plate having an outward-facing surface and an inward-facing surface, and the body is formed having through holes that extend between the outward-facing surface and the inward-facing surface. In addition, the fuel tank assembly includes fasteners that are received in the through holes and mechanically connect the body to the fuel tank, wherein the fasteners provide an electrical connection between the body and the fuel tank.

In some aspects, a vehicle fuel tank assembly includes a fuel tank and an electrically conductive top plate that closes and seals a fuel-fill opening in the fuel tank. The top plate includes electrical dissipation structures and features that allow for electrical charge dissipation of the fuel tank to an external structure such as the vehicle chassis. Since the static electrical charge of the fuel tank is dissipated to the vehicle chassis, there is no charge imbalance between the vehicle fuel tank and the rest of the vehicle, whereby an uncontrolled electrical discharge of the static electricity can be avoided.

The dissipation structures include an electrically insulative carrier that is partially embedded in the top plate using an overmolding process, and an electrical conductor that is supported by the carrier. The electrical conductor provides an electrical connection between the top plate and the chassis that is independent of the fuel tank and the fuel tank mounting structure. In addition, the electrical conductor is a wire having sufficient length to permit connection to the chassis at a location remote from the fuel tank.

In some embodiments, the carrier supports more than one electrical conductor, of which only one electrical conductor is electrically connected to the top plate and provides a path by which static electrical charge is dissipated from the fuel tank. The other electrical conductors are electrically isolated from the top plate by the carrier and include terminals that are also supported by the carrier. The electrically isolated terminals are supported by the carrier in such a way that they protrude from an inner surface of the top plate into the interior of the fuel tank. This configuration allows for power and/or signal connections to be made to sensors and/or other electrical devices disposed in the fuel tank.

The carrier is configured so that the electrical conductors are supported relative to the top plate in an orientation that is parallel to an outer surface of the top plate and protrude out of the carrier in a direction parallel to the top plate outer surface. This allows the carrier to have a low profile. In other words, the carrier has a thickness that is small relative to its length and width, and that is small relative to the thickness, length and width of the top plate. This is advantageous in motorcycle applications where packaging space is minimal. For example, in some applications, a low profile carrier may permit a more compact assembly of the fuel cap and/or fuel neck with the fuel tank.

By providing the fuel tank top plate with the carrier having the long electrical conductors, it is possible to locate the electrical connector that joins the fuel tank to the vehicle at a location that is remote from the fuel tank. Since the electrical connector is located remotely from the fuel tank, the amount and quality of possible packaging designs for the electrical connector are increased.

BRIEF DESCRIPTION OF THE FIGURES

FIG. 8 is a top perspective view of an alternative embodiment top plate.

FIG. 9 is a cross sectional view of the alternative embodiment top plate as seen along line 9-9 of FIG. 8.

FIG. 10 is a cross sectional view of the alternative embodiment top plate as seen along line 10-10 of FIG. 8.

DETAILED DESCRIPTION

Figure 1:
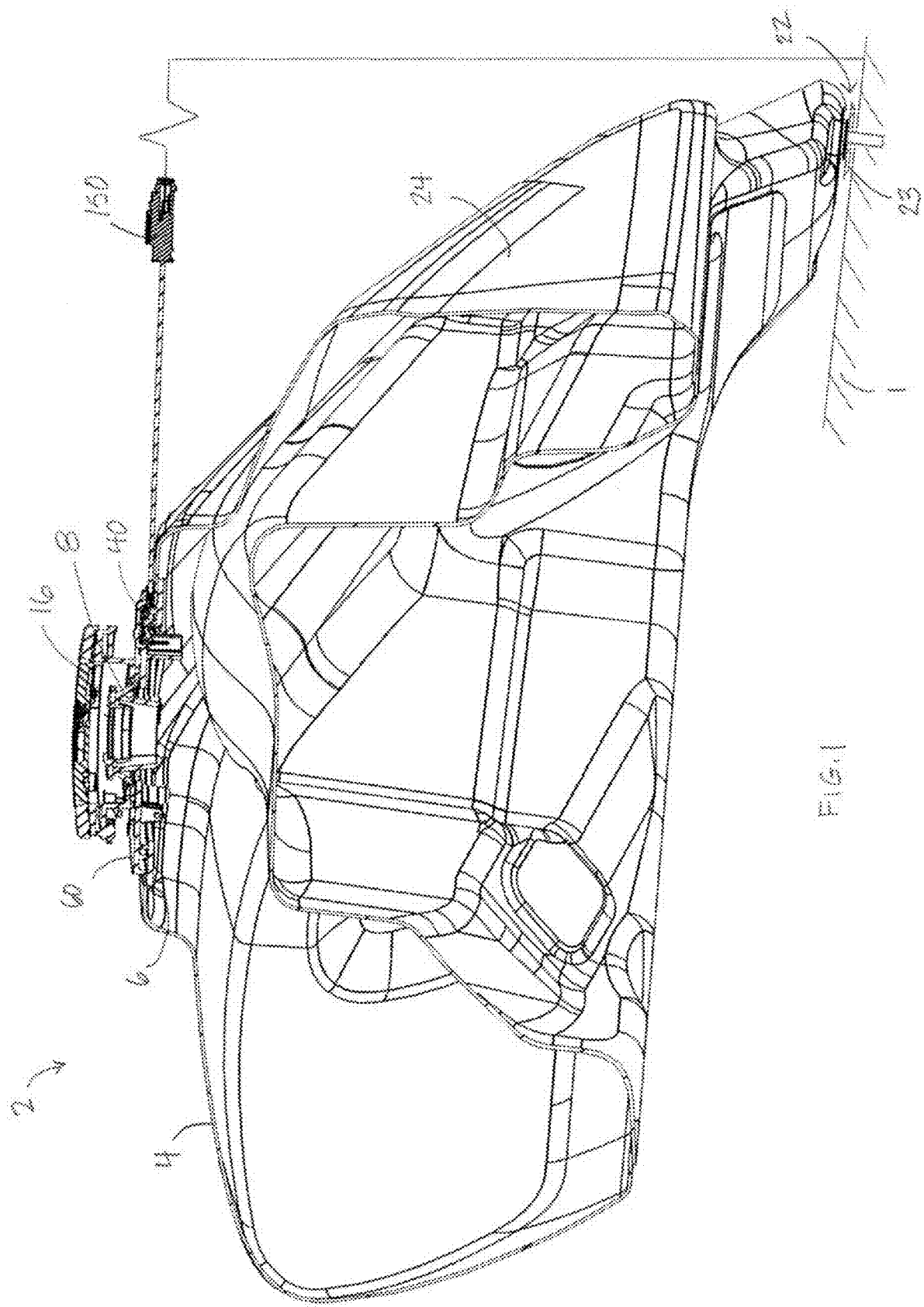
FIG. 1 is side cross sectional view of a vehicle fuel tank assembly including a fuel tank and a top plate that seals a fuel fill opening in the fuel tank.

Referring to FIG. 1, a vehicle fuel tank assembly 2 includes a fuel tank 4, a fuel filler neck 8 disposed in an opening 6 in the fuel tank 4, and a top plate 60 that supports the fuel filler neck 8 relative to the fuel tank opening 6 and seals the opening 6. The fuel tank assembly 2 further includes a fuel cap 16 that is used to close an outer end of the fuel filler neck 8. The fuel tank 4 is mounted to a vehicle (not shown), which may be, but is not limited to, a saddle-type vehicle such as a motorcycle, jet-ski or four-wheeler. In some embodiments, the mounting assembly 22 used to secure the fuel tank 4 to the vehicle includes electrically insulating elements 23 whereby the fuel tank 4 is not electrically connected to the vehicle via the mounting assembly 22. The top plate 60 includes electrical dissipation structures and features that allow for electrical charge dissipation of the fuel tank 4 to an external structure such as the vehicle chassis 1, as described in detail below.

The fuel tank 4 is an irregularly shaped enclosure. An outer surface 24 of the fuel tank 4 may be painted or coated in such a way and/or with such a material that a direct contact between the fuel tank outer surface 24 and other vehicle components does not result in an electrical discharge of static electricity from the fuel tank 4 to the vehicle. The fuel tank 4 includes the fill opening 6, which is located in a top side of the fuel tank. As used herein, terms describing relative position such as "top", "bottom", "upper", "lower", "above" and "below" are used with reference to the fuel tank 4 as oriented for normal operation, as shown in FIG. 1.

The filler neck 8 is supported in the fill opening 6 via the top plate 60. The filler neck 8 protrudes outward from the fuel tank 4. The fuel cap 16 is secured to and closes the outer end of the fuel filler neck 8, and can be selectively opened and closed to allow fuel to be added to the fuel tank 4.

Figure 2:
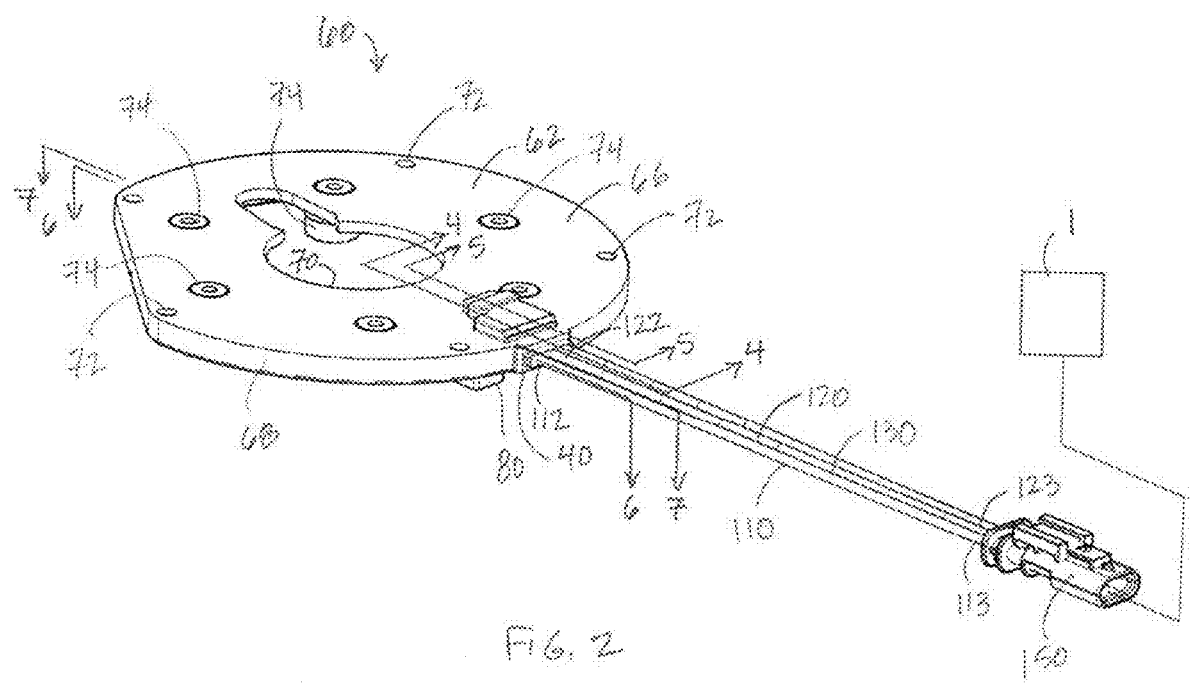
FIG. 2 is a top perspective view of the top plate of FIG. 1.
Figure 3:
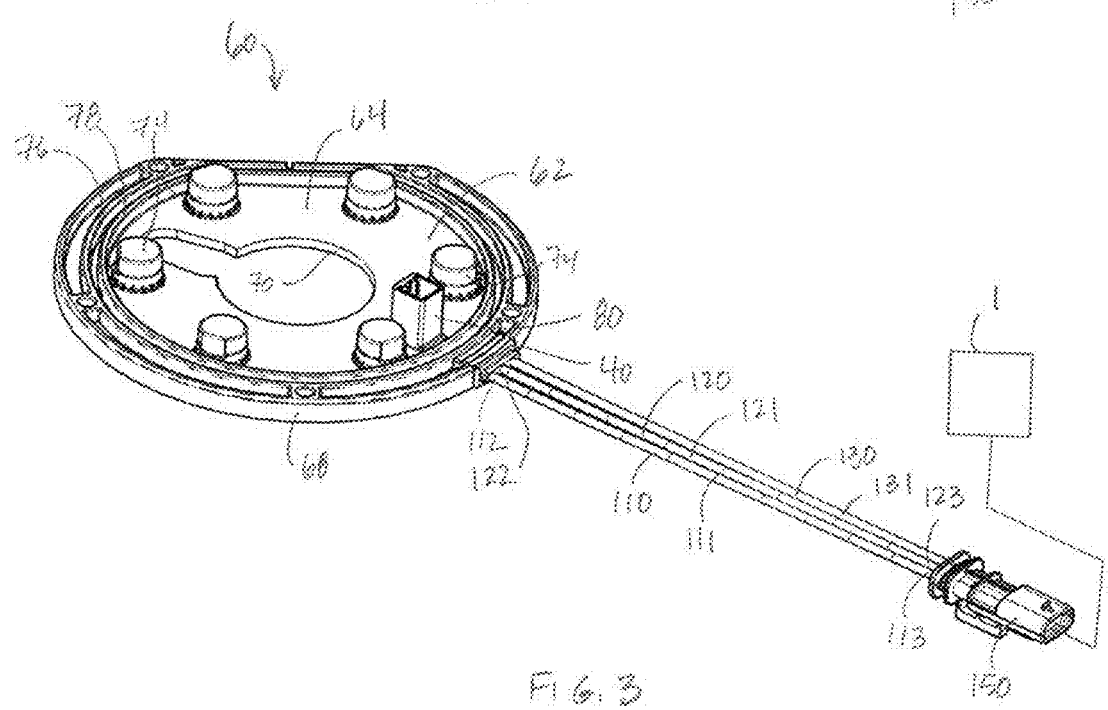
FIG. 3 is a bottom perspective view of the top plate of FIG. 1.
Figure 4:
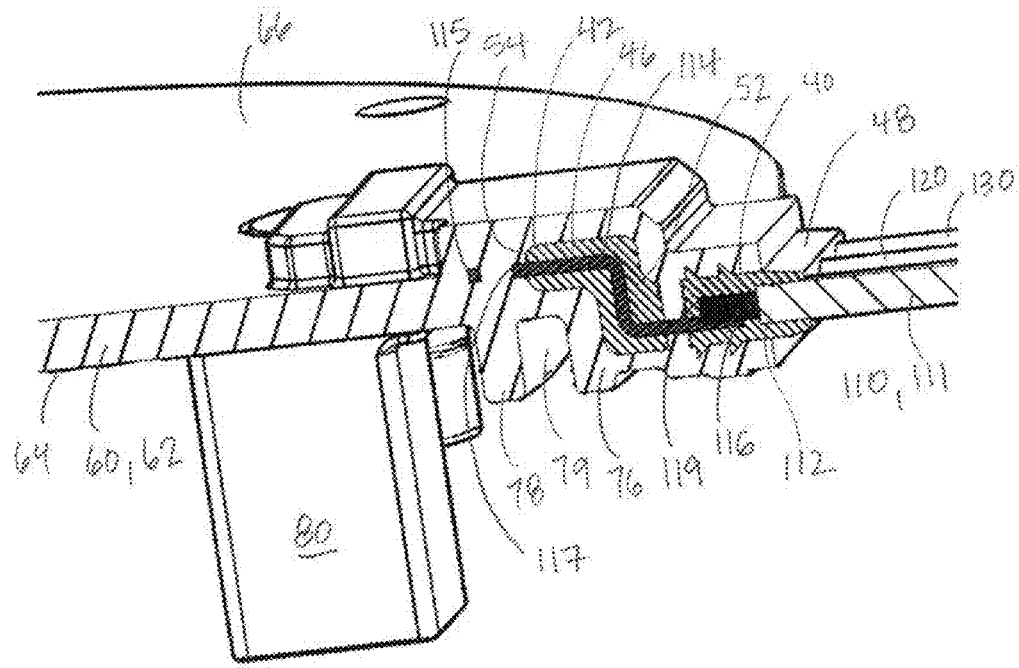
FIG. 4 is a cross sectional view of the top plate as seen along line 4-4 of FIG. 2.
Figure 5:
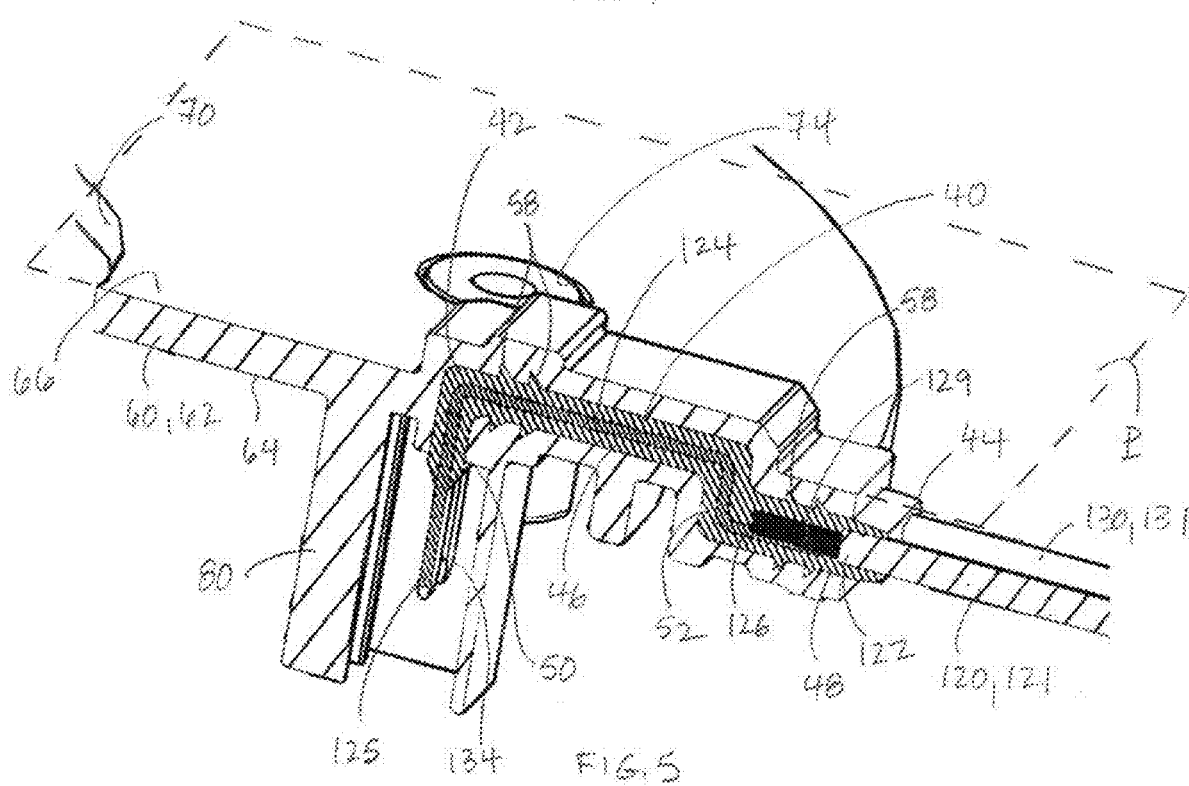
FIG. 5 is a cross sectional view of the top plate as seen along line 5-5 of FIG. 2.
Figure 6:
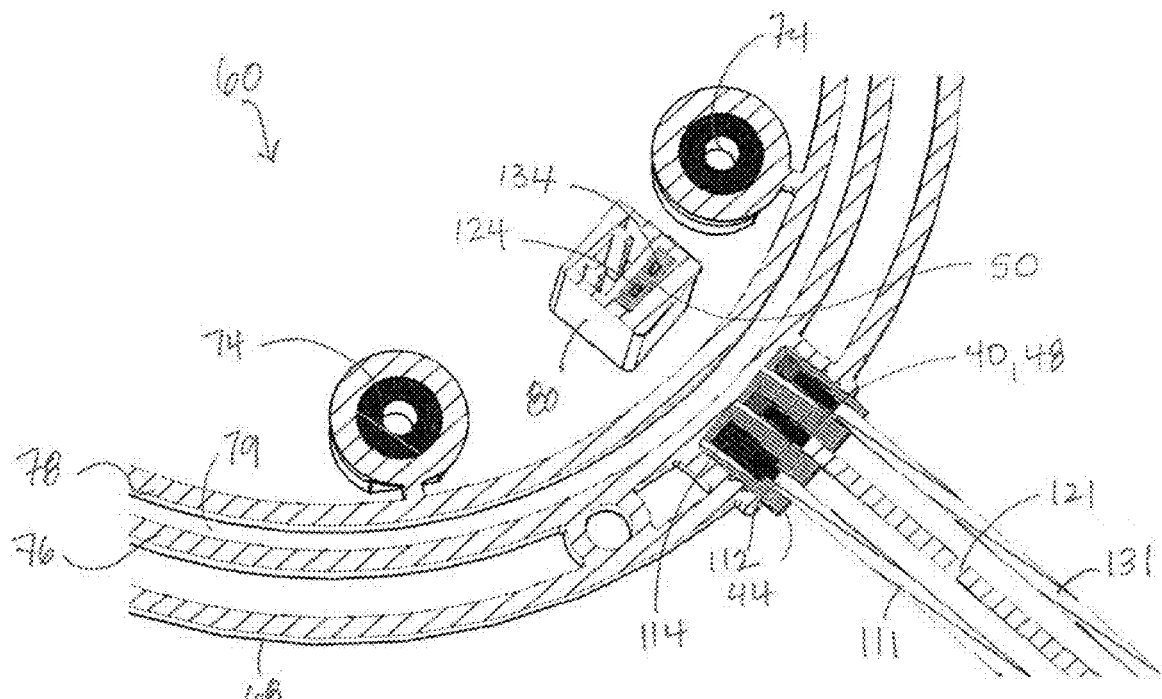
FIG. 6 is a cross sectional view of the top plate as seen along line 6-6 of FIG. 2.

Referring to FIGS. 2 and 3, the top plate 60 is configured to seal the fuel fill opening 6 of the fuel tank 4, and includes a body 62 that is formed of an electrically conductive material, a carrier 40 that is formed of an electrically insulating material, and electrical conductors 110, 120, 130 that are supported by the carrier 40.

The body 62 is a generally planar plate that has an outward-facing surface 66, an inward-facing surface 64 and a peripheral edge 68 that extends between the outward-facing surface 66 and the inward-facing surface 64. The body 62 is thin in that the body thickness is very small relative to its length and width, where the body thickness corresponds to a distance between the inward-facing surface 64 and the outward facing surface 66. The peripheral edge 68 defines an irregular peripheral shape that includes a circular portion 68a and a linear portion 68b. The body 62 is formed having a key-shaped central opening 70 that receives the fuel filler neck 8. The body 62 includes blind holes 74 that open at the outward facing surface 66. The blind holes 74 are disposed between the central opening and the peripheral edge 68, and are used to secure a flange 9 of the fuel filler neck 8 to the outward-facing surface 66. In addition, the body 62 includes through-holes 72 that extend between the outward facing surface 66 and the inward-facing surface 64. The through-holes 72 are disposed between the blind holes 74 and the peripheral edge 68, and are configured to receive fasteners (not shown) used to secure the body 62 to the fuel tank 4. The fasteners are electrically conductive bolts that both secure the top plate 60 to the fuel tank 4, and provide an electrical connection between the body 62 and the fuel tank 4.

The body inward-facing surface 64 includes a pair of parallel ribs 76, 78 that are closely spaced and extend circumferentially. A gasket 30 is disposed in the groove 79 that is formed between the ribs 76, 78. The gasket 30 provides a seal between the body 62 and the fuel tank 4. A shroud 80 protrudes inward from the body inward-facing surface 64. The shroud 80 is aligned with the carrier 40 in the thickness direction of the body 62, and is configured to surround electrical terminals 124, 134 that protrude inward from the carrier 40, as discussed further below.

The body 62 is formed of an electrically-conductive plastic material that is suitable for use with fuels and solvents. Suitable materials include, but are not limited to, a polyacetal resin such as Ultraform® N2320C that is manufactured by BASF Corporation of Florham Park, N.J., USA, or a polyoxymethylene (POM) such as Hostaform® EC140XF, EC141SXF, or CF802 that are manufactured by Celanese Corporation of Irving, Tex., USA. Use of an electrically conductive plastic is advantageous since such plastics are light weight, relatively low in cost and can be used in an overmolding manufacturing process. The overmolding manufacturing process, in turn, allows for shapes that are difficult to manufacture from metal.

Referring also to FIGS. 4-7, the carrier 40 is an elongate structure that is partially embedded in the body 62. This can be achieved, for example, by forming the carrier 40 separately from the body 62, and then overmolding the body 62 onto the carrier 40. The carrier 40 includes a first end 42 that is embedded within, and surrounded by, the body 62, and a second end 44 that is opposed to the first end 42 and resides outside the body 62. The carrier second end 44 protrudes from the body peripheral edge 68, and thus protrudes in a direction parallel to a plane P that includes the body outward-facing surface 64. The carrier 40 includes a first portion 46 that is aligned with the plane P and includes the carrier first end 42. The carrier 40 includes a second portion 48 that is parallel to the first portion 46, and offset relative to the first portion 46 so as to reside closer to the inside of the fuel tank 4 than the first portion 46. The carrier second portion 48 includes the carrier second end 44, and thus protrudes from the body peripheral edge 68. The carrier 40 includes a depending portion 50 that extends between the carrier first portion 46 and the body inward-facing surface 64. An end of the depending portion 50 protrudes from the body inward-facing surface 64, and is surrounded by the shroud 80. In addition, the carrier 40 includes a step portion 52 that extends between the carrier first portion 46 and the carrier second portion 48. The carrier depending portion 50 and the carrier step portion 52 are disposed at opposed ends of the carrier first portion 46, and each extend in a direction perpendicular to the plane P.

Figure 7:
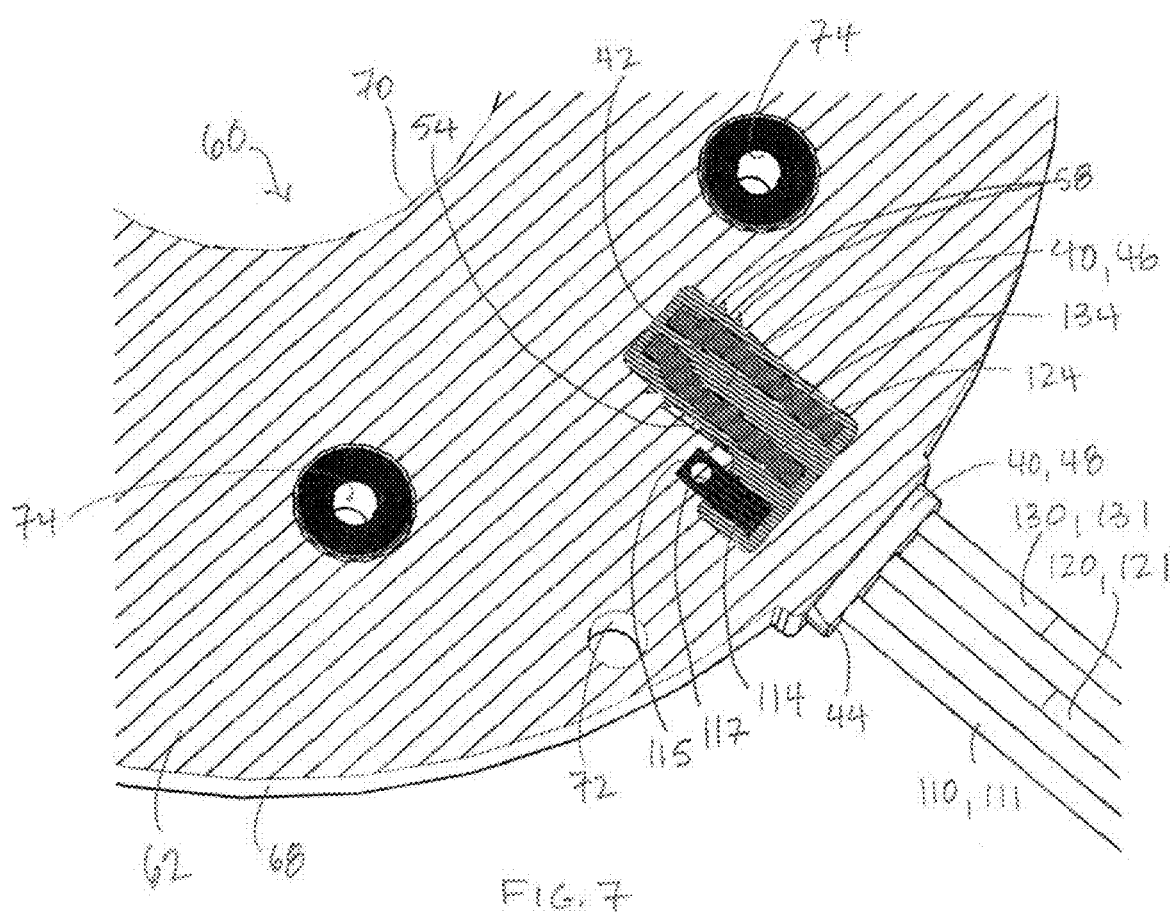
FIG. 7 is a cross sectional view of the top plate as seen along line 7-7 of FIG. 2.

As seen in the cross-sectional view of the carrier 40 illustrated in FIG. 7, the first portion 46 of the carrier 40 includes a cut out 54 that intersects the carrier first end 42, whereby the first portion 46 has an L shape. In addition, the carrier 40 may include melt ribs 58. The melt ribs 58 are protrusions that extend continuously about a circumference of the carrier 40, and form a robust and leak-proof connection between the carrier 40 and the body 62 during the overmolding manufacturing process. In the illustrated embodiment, the carrier 40 includes a pair of melt ribs 58 at each of the first and second ends 42, 44 of the carrier 40.

The carrier 40 is manufactured from an electrically-insulating plastic material that is suitable for use with fuels and solvents.

The carrier 40 supports three electrical conductors 110, 120, 130 within the top plate 60 in such a way that one of the electrical conductors (e.g., the first electrical conductor 110) is electrically connected to the body 62, and the remaining electrical conductors (e.g., the second and third electrical conductors 120, 130) are electrically isolated from the body 62 by the carrier 40.

The first electrical conductor 110 includes an electrically conductive first wire 111 and an electrically conductive first terminal 114. The first terminal 114 is configured to electrically connect the first wire 111 to the body 26, as discussed further below. A first end 112 of the first wire 111 is electrically connected, for example via welding, to the first terminal 114 within the carrier second portion 48. The first wire 111 is supported in the carrier second portion 48 and protrudes from the carrier second end 44 in a direction parallel to the plane P, whereby a second end 113 of the first wire 111 is disposed outside of the top plate 60. More specifically, the first wire 111 is long relative to the dimensions of the top plate 60, and the second end 113 of the first wire 111 is electrically connected to a connector 150 that is remote from the top plate 60. The connector 150, in turn, is electrically connected to a structural portion of the vehicle that is external to the fuel tank assembly 2 such as the vehicle chassis 1, which serves as an electrical ground. Thus, the electrical connection of the first wire 111 to the vehicle chassis 1 is made via a connector 150 at a location that is remote from the top plate 60, and the first electrical conductor provides a path by which the static electrical charge of the fuel tank 4 is dissipated to ground.

The first terminal 114 is a rigid, elongate, electrically-conductive pin. The first terminal 114 includes a first end 115, and a second end 116 that is opposed to the first end 115. The first terminal 114 has a bent shape so as to correspond to the shape of the carrier 40, for example as seen in the cross-sectional view illustrated in FIG. 4. The first end 115 of the first terminal 114 protrudes from the carrier first portion 46 into the region of the top plate body 62 defined by the cut out 54, where it is embedded in the body 62. As a result, the first terminal first end 115 is electrically connected to the body 62. In the illustrated embodiment, the first terminal first end 115 includes a through-hole 117 which receives the material used to form the body 62. As a result, the through-hole 117 anchors the first terminal 114 within the body 62 and enhances the electrical connection between the first terminal 114 and the body 62. The second end 116 of the first terminal 114 is electrically connected to the first wire 111, for example via a first weld 119. The first weld 119 is located within the carrier second portion 48. In particular, the first weld 119 is embedded in the carrier 40 at a location at which the carrier 40 is embedded in the body 62. As a result, the electrical connection between the first wire 111 and the first terminal 114 is reliably supported.

The second electrical conductor 120 includes an electrically conductive second wire 121 and an electrically conductive second terminal 124. The third electrical conductor 130 includes an electrically conductive third wire 131 and an electrically conductive third terminal 134. The second and third electrical conductors 120, 130 are configured to provide a path by which power and/or signal connections may be made to sensors and/or other electrical devices disposed in the fuel tank. The second and third electrical conductors 120, 130 are substantially similar, and thus only the second electrical conductor 120 will be described, and common elements will be referred to with common reference numbers.

A first end 122 of the second wire 121 is electrically connected, for example via welding, to the second terminal 124 within the carrier second portion 48. The second wire 121 is supported in the carrier second portion 48 and protrudes from the carrier second end 44 in a direction parallel to the plane P, whereby a second end 123 of the second wire 121 is disposed outside of the top plate 60. More specifically, the second wire 121 is long relative to the dimensions of the top plate 60, and the second end 123 of the second wire 121 is electrically connected to the connector 150. The connector 150, in turn, electrically connects the second wire 121 to a power source, a controller or other appropriate electrical component.

The second terminal 124 is a rigid, elongate, electrically-conductive pin. The second terminal 124 includes a first end 125, and a second end 126 that is opposed to the first end 125. The second terminal 124 has a bent shape so as to correspond to the shape of the carrier 40, for example as seen in the cross-sectional view illustrated in FIG. 5. The first end 125 of the second terminal 124 protrudes from the carrier depending portion 50 into the shroud 80. As a result, the second terminal first end 125 is surrounded by, and protected by, the shroud 80. In addition, the second terminal first end 125 is available for electrical connection to a sensor or other electrical device disposed, in the fuel tank 4. The second end 126 of the second terminal 124 is electrically connected to the second wire 121, for example via a second weld 129. The second weld 129 is located within the carrier second portion 48. In particular, the second weld 129 is embedded in the carrier 40 at a location at which the carrier 40 is embedded in the body 62. As a result, the electrical connection between the second wire 121 and the second terminal 124 is reliably supported.

The connector 150 is disposed at a location of the vehicle that is remote from the fuel tank 4. The connector 150 is configured to provide an electrical connection between the first electrical conductor 110 and structural component of the vehicle such as the chassis 1, whereby static electrical charge that accumulates on the fuel tank is dissipated to the chassis 1 via the first electrical conductor 110. In addition, the connector 150 may also provide an electrical connection between the second and third electrical conductors 120, 130 and other vehicle electronics and/or control systems (not shown).

Referring to FIGS. 8-10, an alternative embodiment top plate 260 is configured to seal the fuel fill opening 6 of the fuel tank 4, and includes a body 262 that is formed of an electrically conductive material, a carrier 240 that is formed of an electrically insulative material, and electrical conductors 110, 120, 130 that are supported by the carrier 240. The body 262 and carrier 240 are similar in form and function to the body 62 and carrier 40 described above with respect to FIGS. 1-7, and common elements are referred to with common reference numbers. The carrier 240 differs from the carrier 40 described above with respect to FIGS. 1-7 in that it is supported on the body 262 so as to be disposed at or above the plane P, and so as to reside at a location that is between the central opening 70 and the peripheral edge 68. Like the earlier-described carrier 40, the carrier 240 illustrated in FIGS. 8-10 supports the first, second and third wires 111, 121, 131 in such a way that the first, second and third wires 111, 121, 131 protrude from the carrier second end 44 in a direction parallel to the plane P, whereby the respective second ends 113, 123, 133 of the first, second and third wires 111, 121, 131 are disposed outside of the top plate 260.

Like the earlier-described carrier 40, a first portion 46 the carrier 240 illustrated in FIGS. 8-10 also includes a cut out 254. In this embodiment, the cut out 254 that intersects a lateral side of the carrier 240, whereby the carrier first portion 46 has a C shape. The first terminal 214 extends through the cut out 254 in such a way that a mid portion 214a of the first terminal 214 is not embedded within the carrier 240, and is instead embedded in the body 262. As a result, the first terminal mid portion 214a is electrically connected to the body 262. In a manner similar to the earlier described embodiment, the second and third terminals 224, 234 are isolated from the body 262 by the carrier 242.

Although the illustrated embodiments show the carrier 40 as supporting three electrical conductors 110, 120, 130, it is understood that the carrier 40 may support a greater number of electrical conductors, or as few as one electrical conductor. In any case, one of the electrical conductors supported by the carrier is used to electrically connect the top plate 60 to a remote wound.

Although the body 62 is described herein as being formed of an electrically conductive plastic material, it is not limited to being an electrically conductive plastic material. For example, in some embodiments, the body 62 may be formed of a metal or other non-plastic electrically conductive material.

Selective illustrative embodiments of the fuel tank assembly and top plate are described above in some detail. It should be understood that only structures considered necessary for clarifying the fuel tank assembly and top plate have been described herein. Other conventional structures, and those of ancillary and auxiliary components of the fuel tank assembly and top plate, are assumed to be known and understood by those skilled in the art. Moreover, while working examples of the fuel tank assembly and top plate have been described above, the fuel tank assembly and top plate are not limited to the working examples described above but various design alterations may be carried out without departing from the fuel tank assembly and top plate as set forth in the claims.

We claim:

1. A top plate that is configured to seal a fuel fill opening of a fuel tank, the top plate comprising:
   a body comprising a first material that is electrically conductive;
   a carrier comprising a second material that is electrically insulative, the carrier being partially embedded in the body; and
   a first electrical conductor that is supported by the carrier in such a way that a portion of the first electrical conductor is electrically connected to the body,
   wherein the portion of the first electrical conductor is electrically connected to the body via direct contact with the body.

2. The top plate of claim 1, wherein the first electrical conductor comprises an electrically conductive first terminal and an electrically conductive first wire,
   the first terminal including the portion of the first electrical conductor that is electrically connected to the body, and
   the first wire having a wire first end that is electrically connected to the first terminal and a wire second end that is disposed outside of the top plate.

3. The top plate of claim 2, wherein the wire second end is electrically connected to electrical ground.

4. The top plate of claim 2, wherein
   the carrier includes a cut out,
   the cut out is disposed in a portion of the carrier that is embedded in the body,
   the first terminal is supported by the carrier in such a way that a portion of the first terminal extends into the cut out, and
   the portion of the first terminal forms an electrical connection with the body.

5. The top plate of claim 2, wherein the first terminal has a first portion that is embedded in the first material and a second portion that is embedded in the second material.

6. The top plate of claim 2, wherein
   the carrier includes a protruding portion that protrudes from the body in a direction parallel to a plane that includes an outward-facing surface of the body, and
   the first wire is supported in the protruding portion so as to extend in a direction that is parallel to the plane.

7. The top plate of claim 1, comprising a second electrical conductor that is supported by the carrier in such a way that the second electrical conductor is electrically isolated from the body.

8. The top plate of claim 1, wherein
   the body is a plate having an outward-facing surface, an inward-facing surface, and a peripheral edge that extends between the outward-facing surface and the inward-facing surface,
   the carrier protrudes from the body in a direction parallel to a plane that includes the outward-facing surface.

9. The top plate of claim 8, wherein the carrier protrudes from the peripheral edge of the body.

10. A fuel tank assembly that includes a fuel tank having a fuel fill opening and top plate that is configured to seal the fuel fill opening, the top plate comprising:
a body comprising a first material that is electrically conductive;
a carrier comprising a second material that is electrically insulative, the carrier being partially embedded in the body; and
a first electrical conductor that is supported by the carrier in such a way that a portion of the first electrical conductor is electrically connected to the body,
wherein the portion of the first electrical conductor is electrically connected to the body via direct contact with the body.

11. The fuel tank assembly of claim 10, wherein the first electrical conductor comprises an electrically conductive first terminal and an electrically conductive first wire,
the first terminal including the portion of the first electrical conductor that is electrically connected to the body, and
the first wire having a wire first end that is electrically connected to the first terminal and a wire second end that is disposed outside of the top plate.

12. The fuel tank assembly of claim 11, wherein the wire second end is electrically connected to electrical ground.

13. The fuel tank assembly of claim 11, wherein
the carrier includes a cut out,
the cut out is disposed in a portion of the carrier that is embedded in the body,
the first terminal is supported by the carrier in such a way that a portion of the first terminal extends into the cut out, and
the portion of the first terminal forms an electrical connection with the body.

14. The fuel tank assembly of claim 11, wherein the first terminal has a first portion that is embedded in the first material and a second portion that is embedded in the second material.

15. The fuel tank assembly of claim 11, wherein
the carrier includes a protruding portion that protrudes from the body in a direction parallel to a plane that includes an outward-facing surface of the body, and
the first wire is supported in the protruding portion so as to extend in a direction that is parallel to the plane.

16. The fuel tank assembly of claim 10, comprising a second electrical conductor that is supported by the carrier in such a way as that the second electrical conductor is electrically isolated from the body.

17. The fuel tank assembly of claim 10, wherein
the body is a plate having an outward-facing surface, an inward-facing surface, and a peripheral edge that extends between the outward-facing surface and the inward-facing surface,
the carrier protrudes from the body in a direction parallel to a plane that includes the outward-facing surface.

18. The fuel tank assembly of claim 17, wherein the carrier protrudes from the peripheral edge of the body.

19. The fuel tank assembly of claim 10, comprising a mounting assembly that electrically isolates the fuel tank assembly from a vehicle that supports the fuel tank assembly.

20. The fuel tank assembly of claim 10, wherein
the body is a plate having an outward-facing surface and an inward-facing surface,
the body is formed having through holes that extend between the outward-facing surface and the inward-facing surface,
the fuel tank assembly includes fasteners that are received in the through holes and mechanically connect the body to the fuel tank, wherein the fasteners provide an electrical connection between the body and the fuel tank.

* * * * *